Patented May 13, 1930

1,758,215

UNITED STATES PATENT OFFICE

RAOUL FELICE BOSSINI AND GUIDO MAIURI, OF LONDON, ENGLAND

CONTINUOUS ABSORPTION REFRIGERATING APPARATUS

No Drawing. Application filed March 28, 1929, Serial No. 350,806, and in Great Britain April 11, 1928.

This invention relates to continuous absorption refrigerating apparatus of the kind employing an absorption liquid, such as water, and in which the refrigerating agent, such as ammonia, is caused to evaporate in, mix with and be absorbed from an inert gas.

The object of the invention is to enable the circulation of said gas and thereby the rate of evaporation and absorption of the refrigerating agent and thus the cooling action of the machine, to be extraneously effected without complication by any varying inherent tendency to circulate due to the evaporation and absorption, other than thermal changes i. e. heat due to absorption.

In the said type of apparatus the partial pressures of the gases in the evaporator determine the freezing temperature obtained, for example, the partial pressure of the ammonia must be of 2 atmospheres absolute if −20° C. is wanted, and 3½ atmospheres absolute if −5° C. is required.

Likewise in the absorber the partial pressures change with the temperature of the cooling water available. Consequently in one and the same apparatus the relative partial pressures in the evaporator can vary greatly.

If the inert gas is of a different specific gravity (i. e. absolute density) from the ammonia, it is obvious that variations of density of the gas mixture will also occur as the ammonia evaporates thereinto and is absorbed therefrom, and such variation of density will interfere with the circulation.

According to the invention, to avoid interference with the circulation, the inert gas in which the evaporation and absorption of the refrigerating agent takes place is of approximately the same specific gravity as that of the refrigerating agent, and the circulation is effected either thermosiphonically by deliberately heating and cooling the gas at appropriate situations along its circulating path or by externally actuated mechanical means. Thus in the various portions of the circulatory path of the gas there is approximately no change in its density as a result of becoming charged with and freed from the vapour of the refrigerant and the circulation can be determined practically solely by the easily controlled externally applied forces. Moreover, the elimination of the varying factor of change of density of the circulating gas due to the evaporation and absorption, other than thermally engendered changes, simplifies the calculation of the appropriate sectional areas of the various portions of the circulatory path.

The gas of approximately the same specific gravity as that of the refrigerating agent may be provided by a single gas or by a mixture of gases, for as is known a mixture of gases acts as a single gas in respect of any physical action and therefore also in the evaporation thereinto and the condensation or absorption therefrom of any volatile and condensable medium inert thereto.

As an example of a single inert gas of approximately the same specific gravity as ammonia, methane is mentioned, whilst a mixture 42.3% of the volume of which is hydrogen and 57.7% is nitrogen, is an example of a mixture of gases of the same specific gravity as ammonia.

We claim:

1. In a continuous absorption refrigerating apparatus, an absorption liquid, a refrigerating agent absorbed by said absorption liquid, and a gas inert to said absorption liquid and said refrigerating agent and of the same specific gravity as said refrigerating agent into and from which said refrigerating agent evaporates and is absorbed.

2. In a continuous absorption refrigerating apparatus, an absorption liquid, a refrigerating agent absorbed by said absorption liquid, and a mixed gas inert to said absorption liquid and said refrigerating agent and of the same specific gravity as said refrigerating agent into and from which said refrigerating agent evaporates and is absorbed.

3. A continuous absorption refrigerating apparatus, charged with water, ammonia, and a gaseous mixture consisting of 42.3 per cent by volume of hydrogen and 57.7 per cent by volume of nitrogen.

In testimony whereof we have signed our names to this specification.

RAOUL FELICE BOSSINI.
GUIDO MAIURI.